US011416160B1

(12) United States Patent
Kawaguchi

(10) Patent No.: US 11,416,160 B1
(45) Date of Patent: Aug. 16, 2022

(54) VOLUME OPERATION PROPAGATION FOR SYNCHRONOUS REMOTE COPY

(71) Applicant: Hitachi, Ltd., Tokyo (JP)

(72) Inventor: Tomohiro Kawaguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/185,367

(22) Filed: Feb. 25, 2021

(51) Int. Cl.
*G06F 3/06* (2006.01)
*G06F 9/52* (2006.01)

(52) U.S. Cl.
CPC ........... *G06F 3/065* (2013.01); *G06F 3/067* (2013.01); *G06F 3/0619* (2013.01); *G06F 3/0644* (2013.01); *G06F 9/522* (2013.01)

(58) Field of Classification Search
CPC ...... G06F 3/065; G06F 3/0619; G06F 3/0644; G06F 3/067; G06F 9/522
See application file for complete search history.

(56) References Cited

U.S. PATENT DOCUMENTS 8,719,220 B2   5/2014 Kawaguchi
9,632,701 B2   4/2017 Watanabe et al.
10,114,691 B2  10/2018 Johri et al.
2011/0107025 A1* 5/2011 Urkude ............... G06F 11/2094
                                              711/E12.001
2017/0192889 A1*  7/2017 Sato .................... G06F 3/0659
2017/0329635 A1* 11/2017 Rathke ................. G06F 30/20
2020/0034308 A1*  1/2020 Shveidel .............. G06F 3/0622
2021/0255778 A1*  8/2021 Garewal .............. G06F 3/0604
2022/0004534 A1*  1/2022 Roenner ............. H04L 67/1095

* cited by examiner

*Primary Examiner* — Hiep T Nguyen
(74) *Attorney, Agent, or Firm* — Procopio, Cory, Hargreaves & Savitch LLP

(57) ABSTRACT

Example implementations described herein are directed to systems and methods for facilitating remote copy pair volume with data consistency. For a command received for one of a first volume and a second volume during execution of a pair synchronization process between the first volume and the second volume, example implementations can involve determining whether an address range of one of the first volume and the second volume configured to be provided to a host computer is to be locked based on the command; locking the address range of the one of the first volume and the second volume for the determination indicative of the address range of one of the first volume and the second volume is to be locked; and executing the command on the first volume and the second volume while the address range configured to be provided to the host computer is locked.

15 Claims, 12 Drawing Sheets

Storage Device 100a

Volume/Pair Management 101-1a

| Volume# 101-1-1 | Attribution 101-1-2 | Pair Storage# 101-1-3 | Pair Volume# 101-1-4 | Quorum ID 101-1-6 | Quorum LBA 101-1-7 | Pair State 101-1-8 |
|---|---|---|---|---|---|---|
| 1 | Primary | 2 | 3 | 943...ed6 | 0 | PAIR |
| 2 | - | - | - | - | - | - |
| 3 | Primary | 2 | 5 | 943...ed6 | 2 | PAIR |
| 4 | Primary | 2 | 4 | 943...ed6 | 1 | COPY |
| 5 | - | - | - | - | - | SMPL |

Storage Device 100b

Volume/Pair Management 101-1b

| Volume# 101-1-1 | Attribution 101-1-2 | Pair Storage# 101-1-3 | Pair Volume# 101-1-4 | Quorum ID 101-1-6 | Quorum LBA 101-1-7 | Pair State 101-1-8 |
|---|---|---|---|---|---|---|
| 1 | - | - | - | - | - | - |
| 2 | - | - | - | - | - | SMPL |
| 3 | Secondary | 1 | 1 | 943...ed6 | 0 | PAIR |
| 4 | Secondary | 1 | 4 | 943...ed6 | 1 | COPY |
| 5 | Secondary | 1 | 3 | 943...ed6 | 2 | PAIR |

FIG. 3

| Command 101-3-1 | Freeze Requirement on Remote Copy 101-3-2 |
|---|---|
| Create Volume | Yes |
| Modify Attribution | No |
| Size Expansion | No |
| Set Remote Copy | No |
| Delete Remote Copy | No |
| Snapshot | Yes |
| Rollback from Snapshot | Yes |
| Format | Yes |
| Set WORM | Yes |

Command List 101-3

FIG. 8

VOLUME OPERATION PROPAGATION FOR SYNCHRONOUS REMOTE COPY

BACKGROUND

Field

The present disclosure is directed to storage systems, and more specifically, to volume operation propagation for synchronous remote copy.

Related Art

Generally, important data is stored redundantly between remote locations to avoid loss against disaster such as fire, waterflood, earthquake, and terrorism. Storage devices provide features known as "storage remote copy", which copies data between paired storage volumes and maintains data consistency when a data write operation from host computer occurs.

The feature is categorized into synchronous storage remote copy and asynchronous remote copy. In synchronous remote copy, there is a technique known as "remote copy virtualization" that synchronizes data between two storage devices or volumes between locations and recognizes them as the same to the host by making their identifiers (IDs) the same. In this technique, both volumes that are to be replicated must be accessible. In the related art, it is generally not possible to achieve consistency, availability, and network partitioning tolerance.

Related art implementations assume that most storage protocols do not guarantee perfect consistency (i.e., the updated data is always readable when the data being updated is read), and availability and network partitioning tolerance are achieved by reducing the consistency level in remote copy virtualization as well.

Various operations occur in storage systems, such as taking volume snapshots. Users who use remote copy virtualization do not care about individual volumes. In this environment, for example, if a snapshot is taken for one site only, but not the other, the snapshot will also be lost when the former system becomes inaccessible due to a disaster.

Therefore, the same operation needs to be performed at both sites. However, if a command overtakes or is overtaken by an Input/Output (IO) in the communication path, the data at both sites may lose consistency. In an asynchronous remote copy environment, there are related art implementations to arrange update data and manipulation commands as journals in the order of receipt, and perform data updates and command execution in this order at the copy destination.

However, using this method for synchronous copy, especially for copy virtualization, the response performance is worse because IO completion must be delayed until the data is propagated.

SUMMARY

Aspects of the present disclosure can involve a method, which can include, for a command received for one of a first volume and a second volume during execution of a pair synchronization process between the first volume and the second volume, determining whether an address range of one of the first volume and the second volume configured to be provided to a host computer is to be locked based on the command; locking the address range of the one of the first volume and the second volume for the determination indicative of the address range of one of the first volume and the second volume is to be locked; and executing the command on the first volume and the second volume while the address range configured to be provided to a host computer is locked.

Aspects of the present disclosure can involve a computer program, which can include instructions involving, for a command received for one of a first volume and a second volume during execution of a pair synchronization process between the first volume and the second volume, determining whether an address range of one of the first volume and the second volume configured to be provided to a host computer is to be locked based on the command; locking the address range of the one of the first volume and the second volume for the determination indicative of the address range of one of the first volume and the second volume is to be locked; and executing the command on the first volume and the second volume while the address range configured to be provided to a host computer is locked. The computer program can be stored on a non-transitory computer readable medium and executed by one or more processors.

Aspects of the present disclosure can involve a system, which can include, for a command received for one of a first volume and a second volume during execution of a pair synchronization process between the first volume and the second volume, means for determining whether an address range of one of the first volume and the second volume configured to be provided to a host computer is to be locked based on the command; means for locking the address range of the one of the first volume and the second volume for the determination indicative of the address range of one of the first volume and the second volume is to be locked; and means for executing the command on the first volume and the second volume while the address range configured to be provided to a host computer is locked.

Aspects of the present disclosure can involve an apparatus, which can involve a processor, configured to, for a command received for one of a first volume and a second volume during execution of a pair synchronization process between the first volume and the second volume, determine whether an address range of one of the first volume and the second volume configured to be provided to a host computer is to be locked based on the command; lock the address range of the one of the first volume and the second volume for the determination indicative of the address range of one of the first volume and the second volume is to be locked; and execute the command on the first volume and the second volume while the address range configured to be provided to the host computer is locked.

BRIEF DESCRIPTION OF DRAWINGS

FIG. 3 illustrates an example of the Volume/Pair Management Table and the Volume/Pair Management Table, in accordance with an example implementation.

FIG. 8 illustrates an example structure of the command list, in accordance with an example implementation.

DETAILED DESCRIPTION

Figure 1:
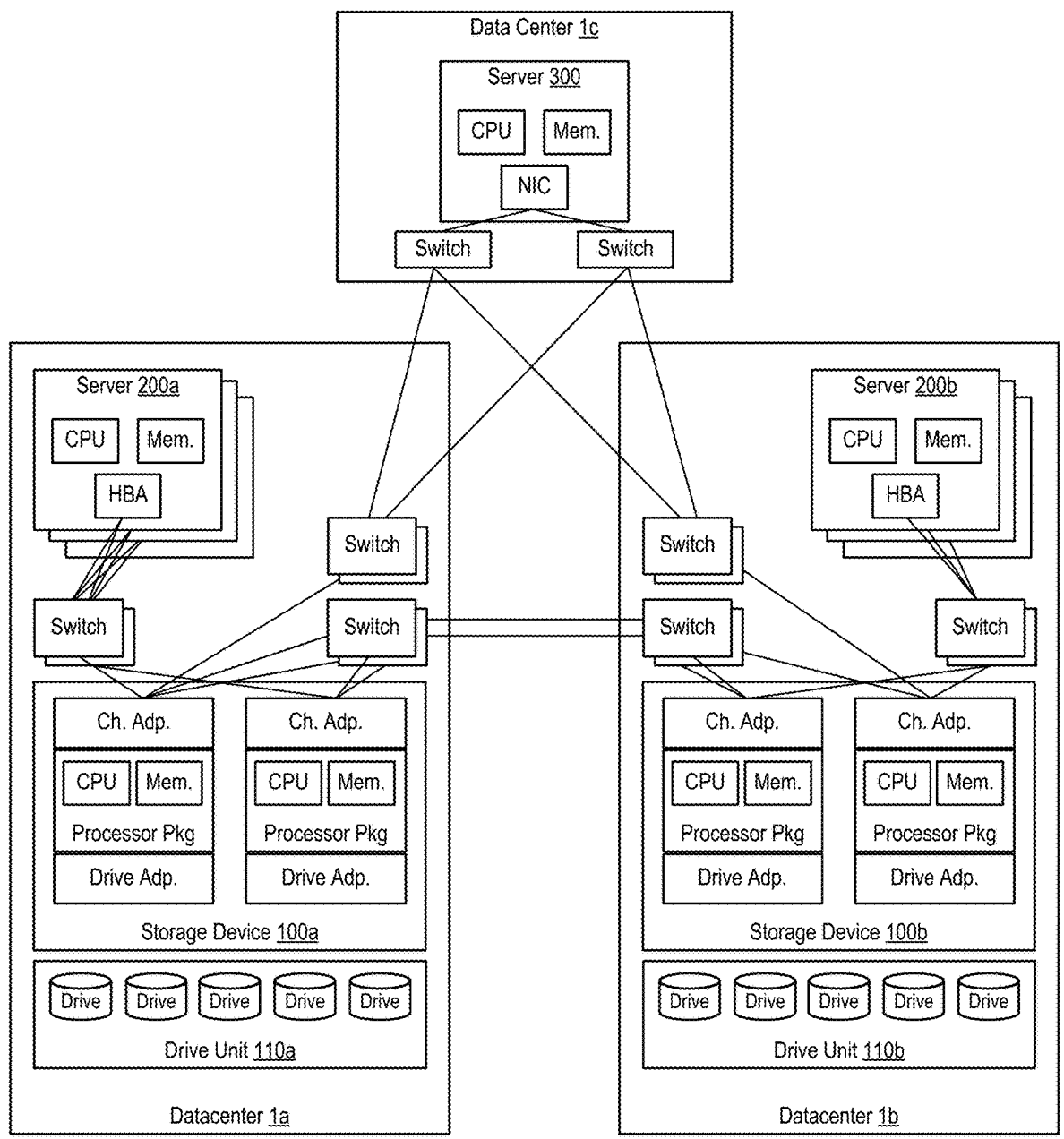
FIG. 1 illustrates a physical configuration of a high available system using asynchronous storage remote copy, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations are directed to data-consistent command operations for volumes forming a copy pair in a synchronous remote copy environment.

In example implementations, for a given address range configured to be provided to a host computer, one of the storage devices managing a volume forming a copy pair is represented to a host computer. When a write command is issued, the representative storage device performs an exclusion of the address range configured to be provided to the host computer, writes data to the representative storage device and then to the other site, and then releases the exclusion. To facilitate the exclusion, the representative storage device locks the address range configured to be provided to the host computer from any modification from the host computer or other devices. When the read command is issued, if the target address belongs to the representative storage device, the exclusion is performed, the read operation is performed, and then the exclusion is released. The term "lock" and "exclude" are utilized interchangeably herein.

Operation commands that needs to be excluded from read and write commands are defined in advance. When the operation command that needs the exclusion is issued, the entire volume is excluded, the operation command is executed on both volumes, and then the exclusion is canceled.

FIG. 1 illustrates a physical configuration of a high available system using asynchronous storage remote copy, in accordance with an example implementation. In the example of FIG. 1, there are three data centers: Data Center 1a, Data Center 1b, and Data Center 1c.

Data Center 1a includes a storage device such as Storage Device 100a. Storage Device 100a includes Channel Adapter to connect to servers, Drive Adapter to connect to Drive Unit 110a, central processing unit (CPU) to control the device and memory to store cache data and control information. Drive Unit 110a stores drives.

Storage servers can include servers such as Server 200a. Server 200a includes CPU, Memory and HBA (Host Bus Adapter). Network switches connect Server 200a and Storage Device 100a.

Data Center 1b includes a storage device such as Storage Device 100b. Storage Device 100b includes Channel Adapter to connect to servers, Drive Adapter to connect to Drive Unit 110b, CPU to control the device and memory to store cache data and control information. Drive Unit 110b stores drives.

Storage servers can include Server 200b. Server 200b includes CPU, memory and HBA (Host Bus Adapter). Network switches connect Server 200b and Storage Device 100b.

Data Center 1c includes a server such as Server 300. Server 300 includes CPU, memory and NIC (Network Interface Card). Storage Device 100a, Storage Device 100b, and Server 300 are connected by network switches. The internal architectures of each of the servers 200a, 200b, 300, and storage devices 100a, 100b are provided in further detail in FIG. 12.

Figure 2:
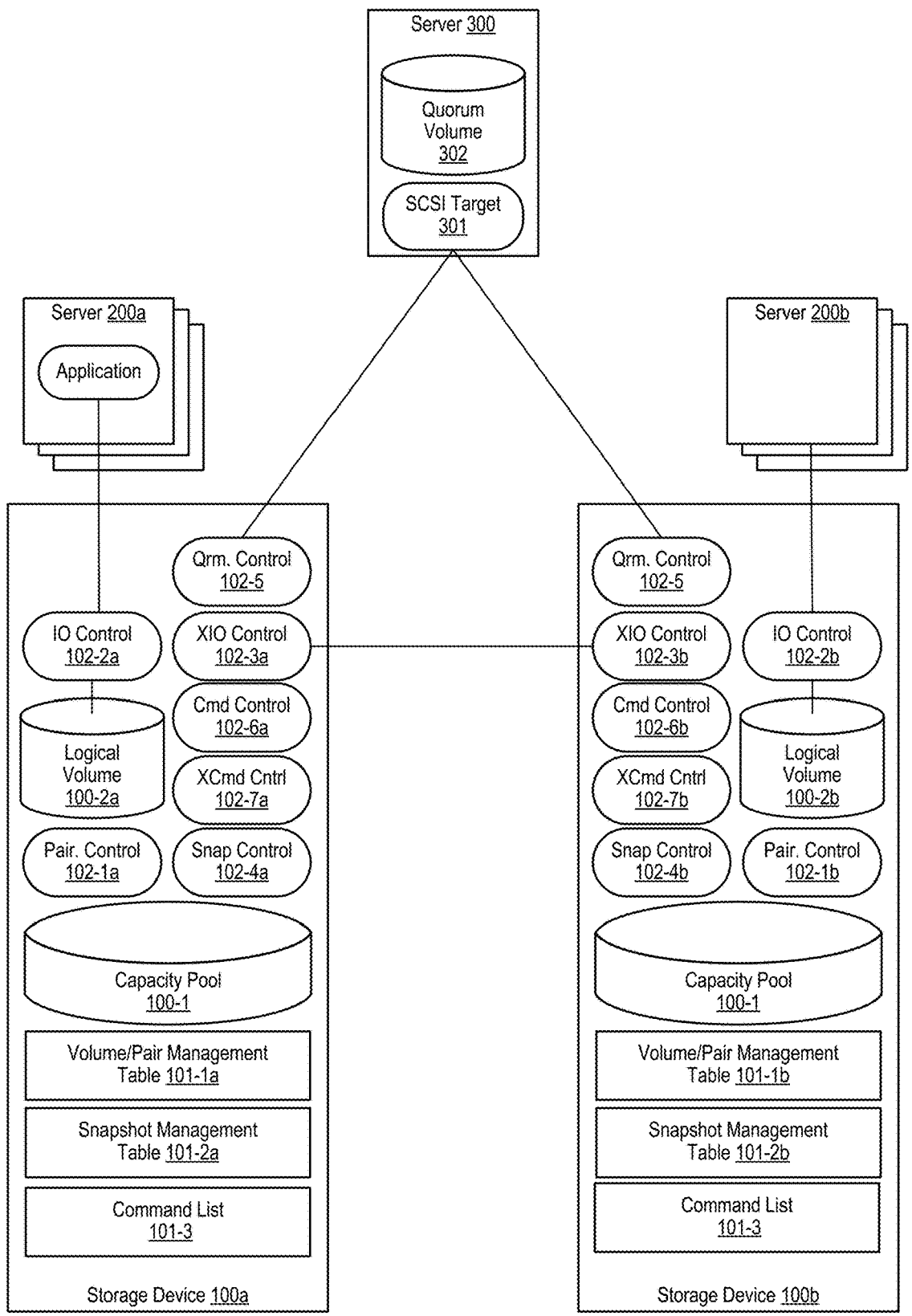
FIG. 2 illustrates an example logical configuration of the high available system using asynchronous storage remote copy, in accordance with an example implementation.

FIG. 2 illustrates an example logical configuration of the high available system using asynchronous storage remote copy, in accordance with an example implementation. Each control program is executed by the CPU of a device. Each management table is stored in memory and used by the CPU of a device. Each logical object is provided by the CPU from using the control program and the management table. The computer environment upon which elements of the system can be implemented is described in further detail in FIG. 12.

Storage Device 100a includes logical objects. Logical Volume 100-2a receives IO command from Server 200a. Server 200a publishes CDB (Command Descriptor Block) for the IO which includes the LBA (Logical Block Address) to the volume. When receiving the read IO command, the storage device transfers data stored in the drives or the memory. After receiving write IO command, the storage device stores data to the memory or drives. This volume is a primary volume of a remote copy pair formed with Logical Volume 100-2b described below. Capacity Pool 100-1a provides capacity to store data for logical volumes.

Control programs can involve the following. Pair Management Control 102-1a controls pair state which changes on events such as pair operation and failure. IO Control 102-2a controls IO behavior of Logical Volume 100-2a (e.g., from a host computer) according to that pair states, such as exclusion and replication. Read or write commands are controlled by IO Control 102-2a.

Transferred IO Control 102-3a Controls IO behavior of Logical Volume 100-2a according to that pair states (e.g., from a paired storage device), such as exclusion and replication. The write command is controlled by the Transferred IO Control 102-3a.

Snap Control 102-4a facilitates data management and control for snapshots such as Mirror, Copy-on-Write, or Redirect-on-Write. Quorum Control 102-5 access control to record and check the alive information to the quorum device. Command Control 102-6a controls operational command behavior of Logical Volume 100-2a (e.g., from a host computer) according to that pair states, such as exclusion and replication. Transferred Command Control 102-7a controls IO behavior of Logical Volume 100-2a (e.g., from a paired storage device) according to that pair states, such as exclusion and replication.

Management tables can involve the following. The Volume/Pair Management Table 101-1a stores volume attribution, ID of paired volume, pair state, and quorum information to manage logical volumes. Snapshot Management Table 101-2a stores snapshot parent volume, status, attribution, date, and generation. Command List 101-3 contains information on whether or not exclusion is required when a command is issued for a volume that has a remote copy set. This information may be hard-coded into Command Control 102-6a and/or Transferred Command Control 102-7a.

Storage Device 100b includes logical objects. Logical Volume 100-2b receives IO command from Server 200b. Server 200b publishes CDB (Command Descriptor Block) for the IO which includes LBA (Logical Block Address) to the volume. When receiving a read IO command, the storage device transfers data stored in the drives or the memory. After receiving a write IO command, the storage device stores data to the memory or drives. This volume is a secondary volume of a remote copy pair formed with Logical Volume 100-2b described below. Capacity Pool 100-1 provides capacity to store data for logical volumes.

The control programs of Server 200b can involve the following. Pair Management Control 102-1b controls the pair state which changes on events such as pair operation and failure. IO Control 102-2b controls IO (from a host computer) behavior of Logical Volume 100-2b according to the pair states, such as exclusion and replication. The read or write command is controlled by IO Control 102-2b.

Transferred IO Control 102-3b controls IO behavior of Logical Volume 100-2b (e.g., from a paired storage device) according to that pair states, such as exclusion and replication. The write command is controlled by the Transferred IO Control 102-3b. Snap Control 102-4b facilitates data management and control for the snapshot, such as Copy-on-Write or Redirect-on-Write. Quorum Control 102-5 facilitates access control to record and check the alive information to quorum device. Command Control 102-6b controls operational command (from a host computer) behavior of Logical Volume 100-2b according to that pair states, such as exclusion and replication. Transferred Command Control 102-7b controls IO behavior of Logical Volume 100-2b (e.g., from a paired storage device) according to that pair states, such as exclusion and replication.

Management tables can include Volume/Pair Management Table 101-1b which stores volume attribution, ID of the paired volume, pair state, and information of quorum to manage logical volumes. Snapshot Management Table 101-2b stores snapshot parent volume, status, attribution, date, and generation.

FIG. 3 illustrates an example of the Volume/Pair Management Table 101-1a and Volume/Pair Management Table 101-1b, in accordance with an example implementation. In example implementations, they both manage the same type of information. Table 101-1a is stored in Storage Device 100a, and table 101-1b is in Storage Device 100b. Volume Number 101-1-1 is an ID of volume in the storage device. Volume Attribution 101-1-2 stores the attribution of the volume, such as Primary, Secondary, Journal, or -(null). "Primary" indicates that the volume is primary volume of remote copy. "Secondary" indicates that the volume is secondary volume of remote copy. "—(null)" indicates that the volume is not used for remote copy.

Pair Storage Number 101-1-3 is an ID of a storage device which a paired volume of the volume is located. Pair Volume Number 101-4 is an ID of a volume in that storage device which the volume paired. Quorum ID 101-1-6 is an ID of the quorum recognized by the storage device and that paired storage device. Quorum LBA 101-1-7 is a logical block address in the quorum device to which the storage and that paired storage device stores the alive information. Pair State 101-1-8 is indicative of the pair state of the volume. SMPL, COPY, PAIR, PSUS, SSUS, PSWS, SSWS, PSUE, -(null), state is stored to the Pair State field 101-1-8. Other states can also be utilized in accordance with the desired implementation. The definition of some of the possible states are as follows.

SMPL: The volume is not part of a pair.
COPY: The volume is conducting a copy operation between primary and secondary volume.
PAIR: The volume and that paired volume is synchronizing data if that primary volume data is updated.
PSUS: The volume is a primary volume of that pair and accepts IO of that data, and the duplication is disabled.
SSUS: The volume is a secondary volume of that pair and does not accept IO of that data, and the duplication is disabled.
PSWS: The volume is a primary volume of that pair and does not accept IO of that data, and the duplication is disabled.
PSUS: The volume is a secondary volume of that pair and accepts IO of that data, and the duplication is disabled.
PSUE: The volume has a pair, but does not accept IO of that volume.
—(null): The volume is not used for a logical volume.

Figure 4:
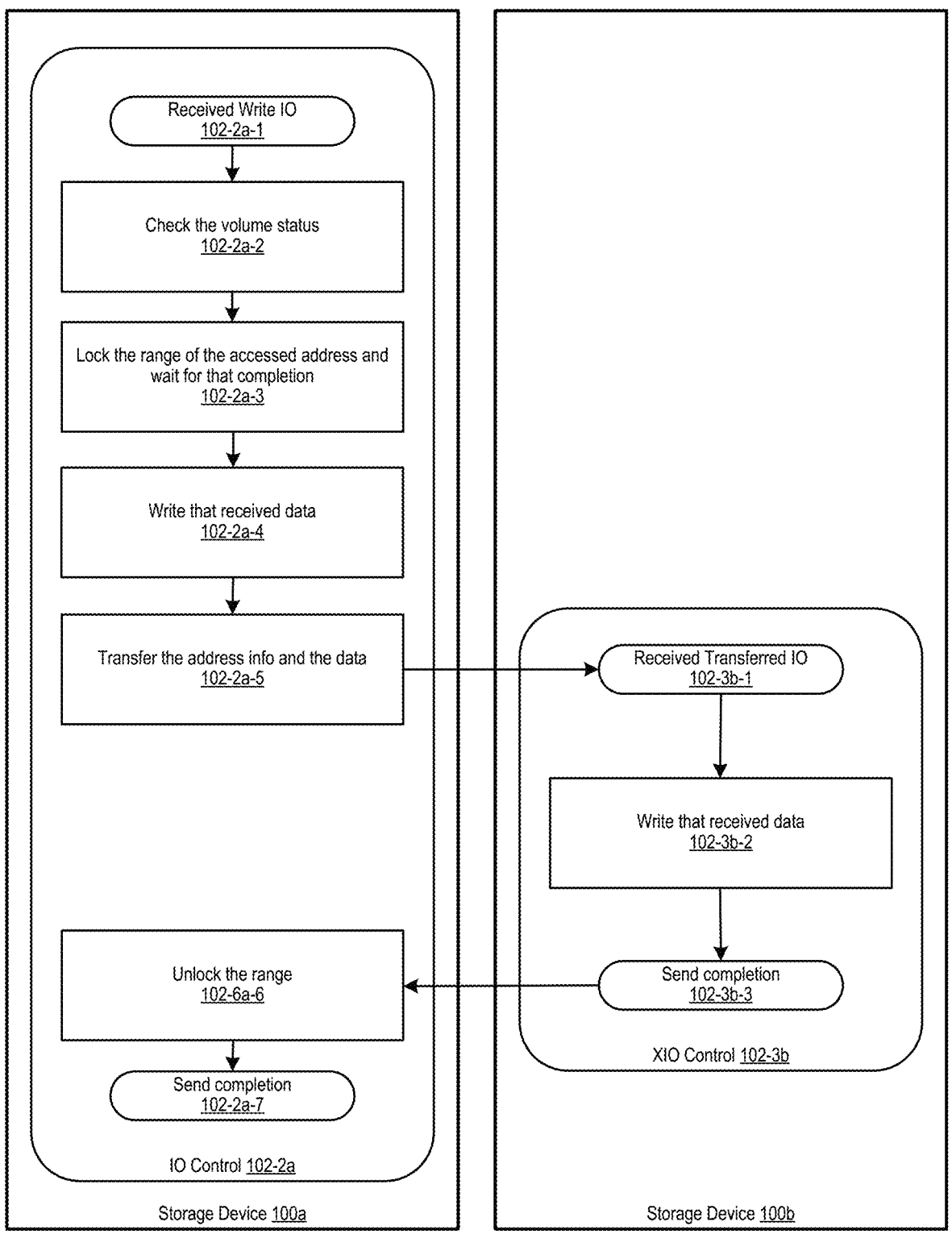
FIG. 4 illustrates an example sequence of IO Control and Transferred IO Control when Logical Volume receives a write command, in accordance with an example implementation.

FIG. 4 illustrates an example sequence of IO Control 102-2a and Transferred IO Control 102-3b when Logical Volume 100-2a receives a write command, in accordance with an example implementation. In this example, the process is directed to the situation when the attribution is "Primary", and that pair state is "PAIR."

IO Control 102-2a can execute the following. At 102-2a-1, the process is invoked when write IO command is received. At 102-2a-2, the process checks that the attribution is "Primary" and pair state is "PAIR." If the attribution or state is different, then the process as described below will also change accordingly. At 102-2a-3 the process tries to exclude the address to prohibit conflicts from other commands operating on the same address. The program will then wait until exclusion is established.

At 102-2a-4, the process writes data to the logical volume. At 102-2a-5, the process transfers the write IO command to the paired volume. The program will then wait until it gets a completion confirmation from the paired volume. At 102-2a-6, the process releases the exclusion. At 102-2a-7, the process terminates the program.

Transferred IO Control 102-3b executes the following process. At 102-3b-1, the process starts when transferred IO command is received. At 102-3b-2, the process writes data to the logical volume. At 102-3b-3, the process returns a completion indication and terminates the program.

Figure 5:
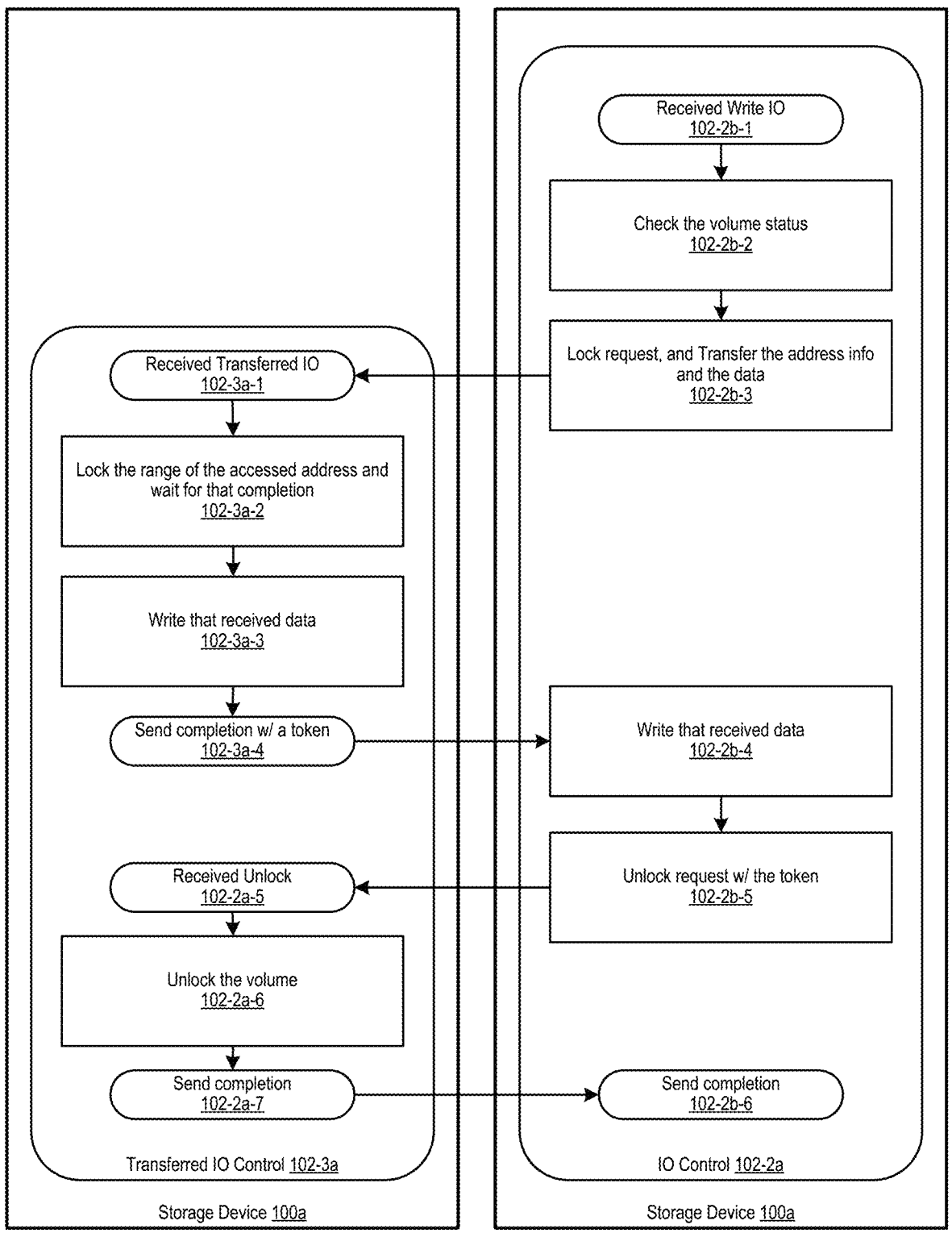
FIG. 5 illustrates another example of the sequence of IO Control and Transferred IO Control when the Logical Volume 100-2*b* receives a write command.

FIG. 5 illustrates another example of the sequence of IO Control 102-2*b* and Transferred IO Control 102-3*a* when the Logical Volume 100-2*b* receives a write command, in accordance with an example implementation. In this example, the process is directed to when the attribution is "Secondary", and the pair state is "PAIR."

IO Control 102-2*a* thereby executes a process as described below. At 102-2*b*-1, the process starts when write IO command is received. At 102-2*b*-2 the process checks that the attribution is "Secondary" and pair state is "PAIR." If the attribution or state is different, then the process as described below will also change accordingly. At 102-2*b*-3, the process transfers the write command with an exclusion request. The program will wait until it gets a completion indication, and will receive a token from the paired volume with the completion message.

At 102-2*b*-4, the process writes data to the logical volume. At 102-2*b*-5, the process sends the exclusion release request to the paired volume including the token received. The program will wait until it gets a completion indication from the paired volume. At 102-2*b*-6, the process returns a completion indication and terminates the program.

Transferred IO Control 102-3*b* executes the following process. The process starts at 102-3*a*-1 when a transferred IO command is received. At 102-3*a*-2, the process tries to exclude the address to prohibit conflicts from other commands directed at the same address, generates a token related to the exclusion, and writes data to the logical volume. At 102-3*a*-3, the process returns a completion indication and terminates the program.

The process at 102-3*a*-4 starts when the exclusion release request is received. At 102-3*a*-5, the process releases the exclusion relating the token. At 102-3*a*-6, the process returns a completion indication and terminates the program.

Figure 6:
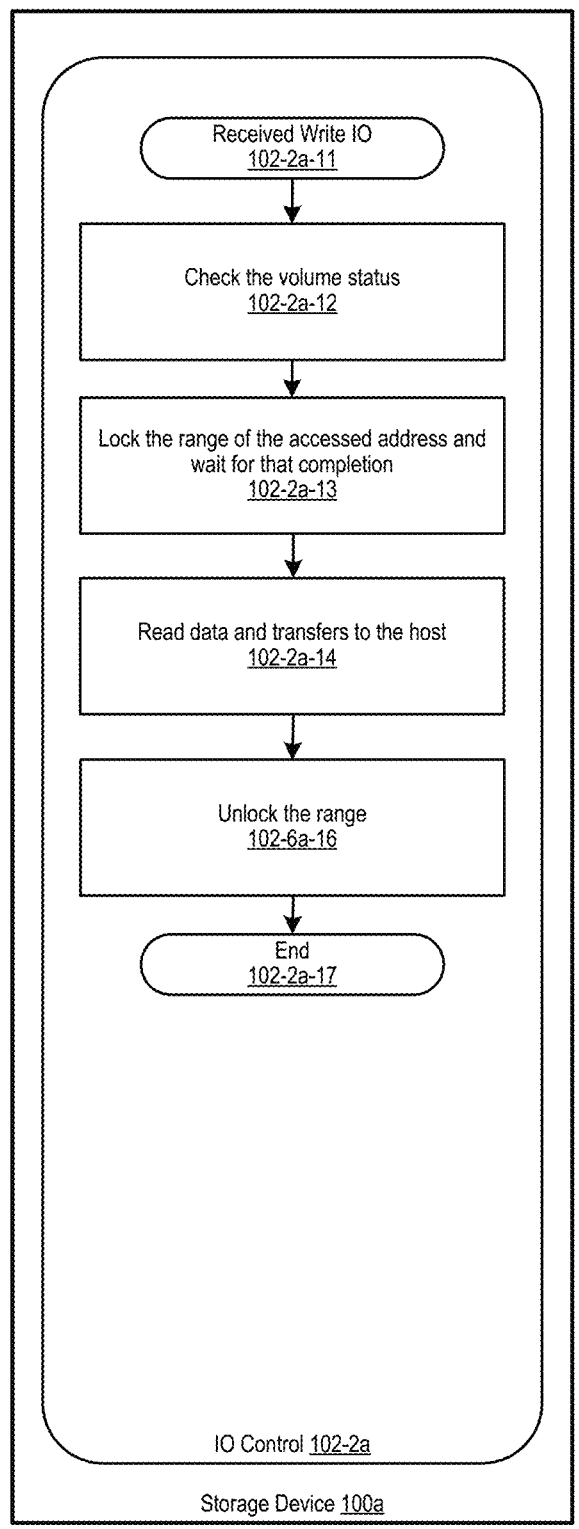
FIG. 6 illustrates an example sequence of IO Control when Logical Volume receives a read command, in accordance with an example implementation.

FIG. 6 illustrates an example sequence of IO Control 102-2*a* when Logical Volume 100-2*a* receives a read command, in accordance with an example implementation. In this example, the process is directed to when the attribution is "Primary", and that the pair state is "PAIR."

IO Control 102-2*a* executes the process as follows. At 102-2*a*-11, the process starts when a read IO command is received. At 102-2*a*-12, the process checks that the attribution is "Primary" and pair state is "PAIR." If the attribution or state is different, then the process as described below will also change accordingly.

At 102-2*a*-13, the process tries to exclude the address to prohibit conflicts from other commands directed at the same address, and waits for the exclusion to complete. At 102-2*a*-14, the process reads data from the logical volume and transfers to that host. At 102-2*a*-16, the process releases the exclusion, and terminates the program at 102-2*a*-17.

Figure 7:
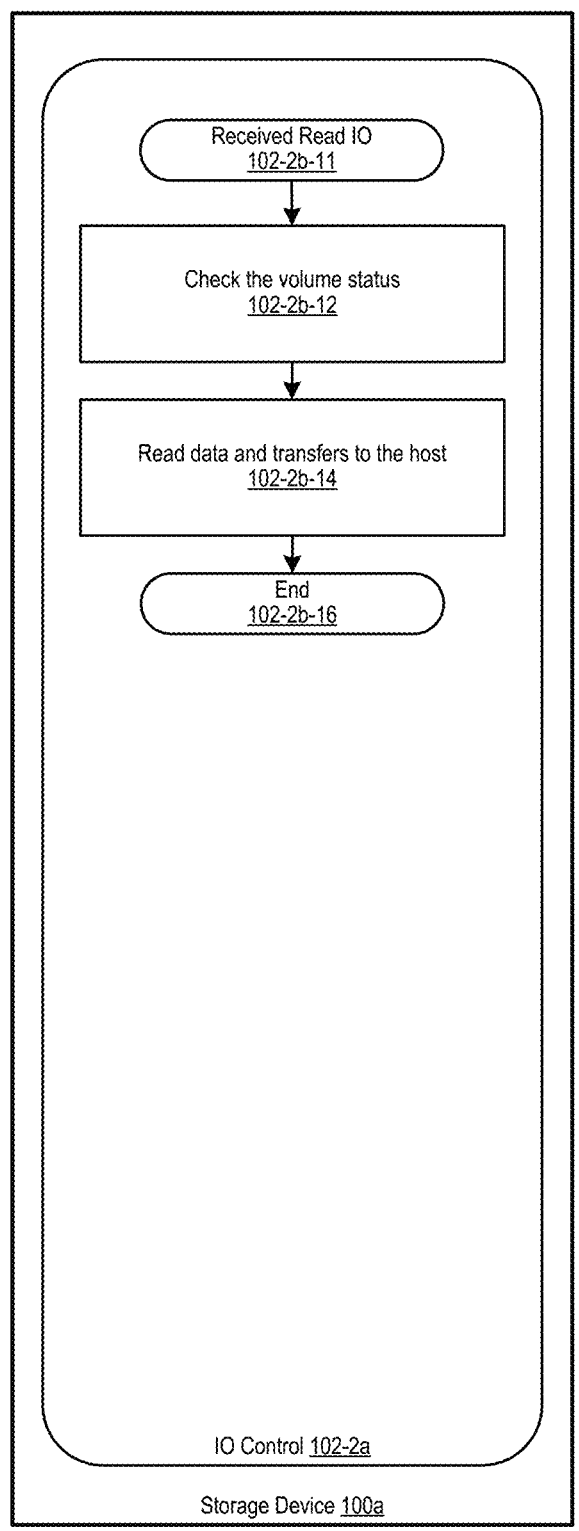
FIG. 7 illustrates another example sequence of IO Control when Logical Volume receives a read command, in accordance with an example implementation.

FIG. 7 illustrates another example sequence of IO Control 102-2*b* when Logical Volume 100-2*b* receives a read command, in accordance with an example implementation. In this example, the process is directed to when the attribution is "Secondary", and that pair state is "PAIR."

The flow starts at 102-2*b*-11 when a read IO command is received. At 102-2*b*-12, the flow determines that the attribution is "Secondary" and pair state is "Secondary." If the attribution or state is different, the flow will alter accordingly. At 102-2*b*-14, the flow reads data from the logical volume and transfers the data to that host. At 102-2*b*-16, the flow terminates the program.

FIG. 8 illustrates an example structure of the command list 101-3, in accordance with an example implementation. The command 101-3-1 lists supporting commands when the remote copy is adopted. The freeze requirement on remote copy 101-3-2 involves information on whether or not exclusion is required when executing a command on a volume to which a remote copy has been applied. In example implementations, the storage devices will refer to the command list of FIG. 8 as it presets freeze requirements for the address range based on command type. If the command to be processed by the storage devices are a command type associated with a freeze requirement for the address range based on the information of FIG. 8, then the storage device will determine that the address range configured to be provided to the host computer is to be locked.

Figure 9:
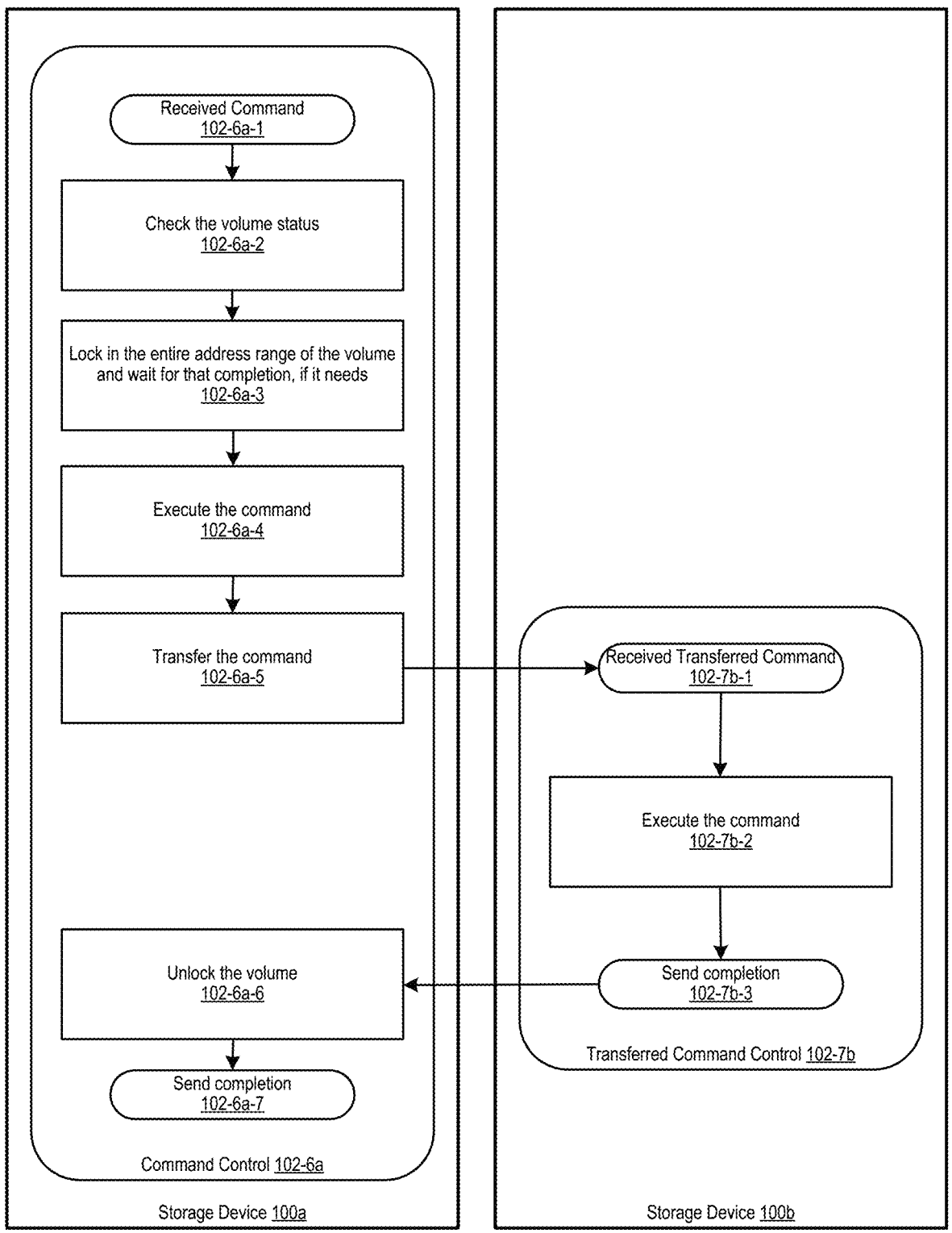
FIG. 9 illustrates an example sequence of Command Control and Transferred Command Control when Logical Volume receives a write command, and when the attribution is "Primary", and the pair state is "PAIR.", in accordance with an example implementation.

FIG. 9 illustrates an example sequence of Command Control 102-6*a* and Transferred Command Control 102-7*b* when Logical Volume 100-2*a* receives a write command, and when the attribution is "Primary", and the pair state is "PAIR.", in accordance with an example implementation.

The flow starts at 102-6*a*-1 starts when operational command listed in Command List 101-3 is received. At 102-6*a*-2, the flow determines that the attribution is "Primary" and pair state is "PAIR." If the attribution or state is different, then the flow will change accordingly.

At 102-6*a*-3, the flow attempts to exclude the address of the volume (e.g., all addresses configured to be directed to the host computer) to prohibit conflicts by other commands for the volume. Depending on the desired implementation, some addresses of the volume may not be configured to be provided to the host computer due to being directed to hidden areas of the volume that are used for internal management of the volume or other purposes. The flow will wait on this step until it gets the exclusion.

At 102-6*a*-4, the flow executes the command to the logical volume. At 102-6*a*-5, the flow transfers the write IO command to the paired volume in storage device 100*b*. The flow will wait on this step until it gets completion from the paired volume. At 102-6*a*-6, the flow releases the exclusion. At, 102-6*a*-7 the flow terminates the program.

In the transferred Command Control 102-7*b*, the flow starts at 102-7*b*-1 when a transferred operational command is received. At 102-7*b*-2, the flow executes the command to the logical volume. At 102-7*b*-3, the flow returns completion and terminates the program.

Figure 10:
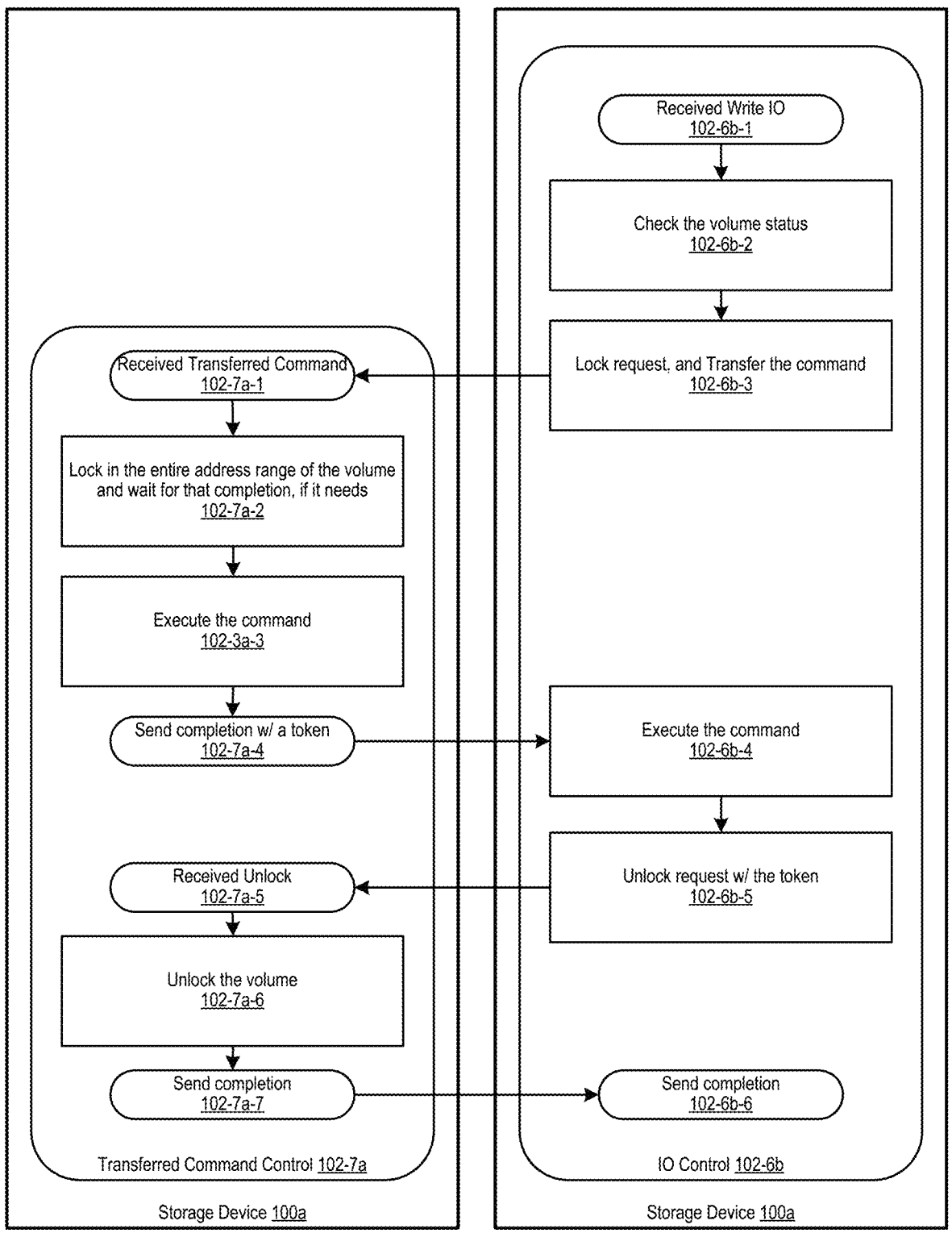
FIG. 10 illustrates an example sequence of Command Control and Transferred Command Control when Logical Volume receives a write command, in which the attribution is "Secondary", and the pair state is "PAIR", in accordance with an example implementation.

FIG. 10 illustrates an example sequence of Command Control 102-6*b* and Transferred Command Control 102-7*a* when Logical Volume 100-2*b* receives a write command, in which the attribution is "Secondary", and the pair state is "PAIR", in accordance with an example implementation.

IO Control 102-6*b* is configured to execute the following flow. The flow begins at 102-6*b*-1 starts when an operational command listed in Command List 101-3 is received. At 102-6*b*-2, the flow determines that the attribution is "Secondary" and pair state is "PAIR." If the attribution or state is different, the following flow will be changed accordingly.

At 102-6*b*-3, the flow transfers the operational command with the exclusion request. The flow will wait on this step until it receives a completion indication from the paired volume to the paired volume. For example, the flow will receive a token from the paired volume with the completion message (e.g., a completion token).

At 102-6*b*-4, the flow executes the command to the logical volume. At 102-6*b*-5, the flow sends the exclusion release request to the paired volume including the token received. The flow will wait on this step until it gets completion from the paired volume. At 102-6*b*-6, the flow returns the completion message and terminates the flow.

Transferred JO Control 102-7*a* is configured to execute the following flow. The flow starts at 102-7*a*-1 when the transferred operational command is received. At 102-7*a*-2, the flow attempts to exclude the address of the volume to prohibit conflicts from other commands for the volume, generates a token which relates the exclusion, and writes data to the logical volume. At 102-7a-3, the flow returns the completion message and terminates the program.

The flow at 102-7a-4 starts when the exclusion release request is received. At 102-7a-5, the flow releases the exclusion relating the token. At 102-3a-6, the flow returns the completion message and terminates the program.

Figure 11A:
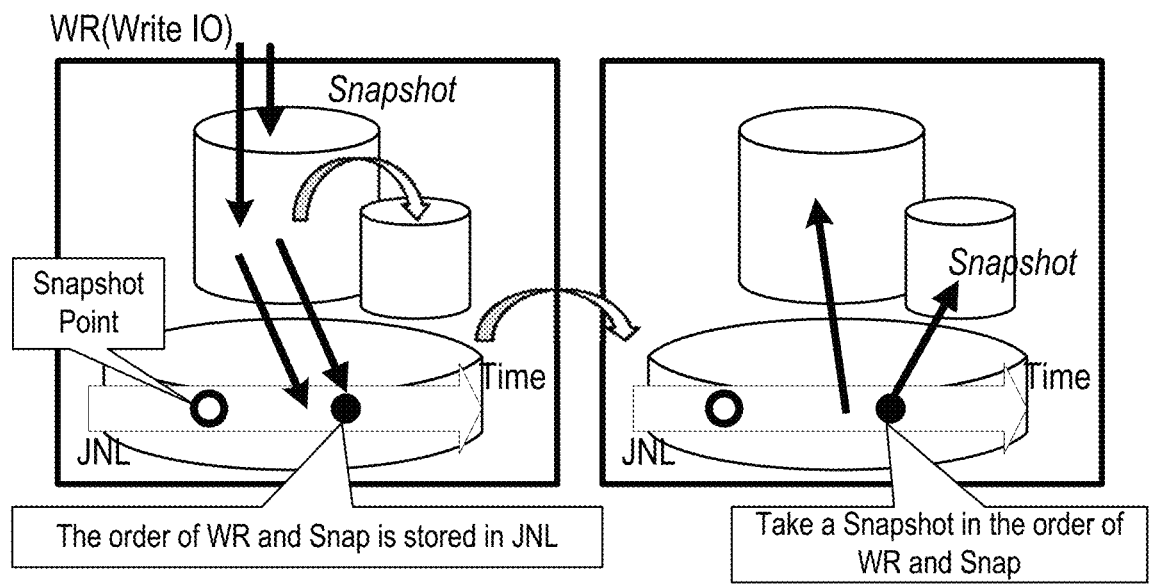
FIGS. 11(A) and 11(B) illustrate an example of the snapshot behavior, in accordance with an example implementation.
Figure 11B:
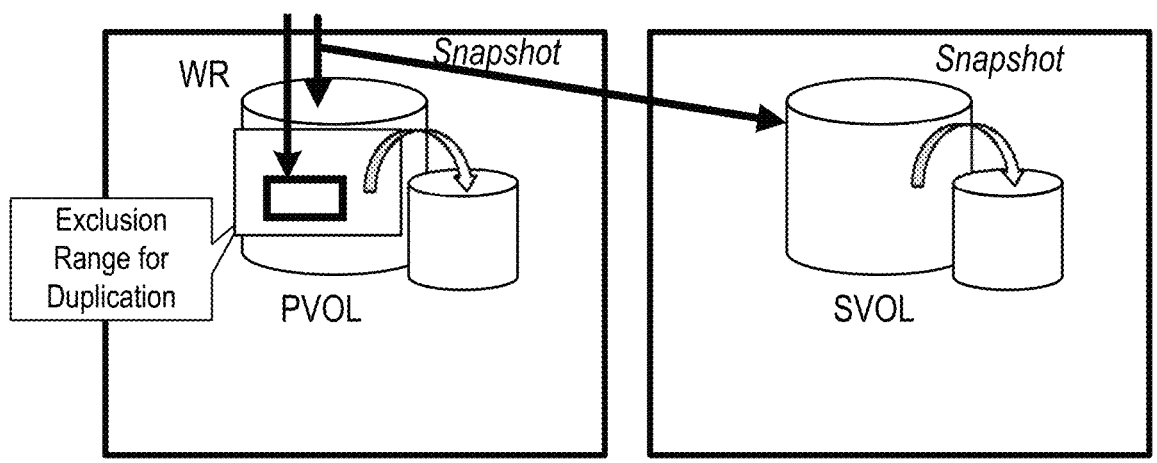

FIGS. 11(A) and 11(B) illustrate an example of the snapshot behavior, in accordance with an example implementation. In an example implementation illustrated in FIGS. 11(A) and 11(B), assume that the snapshot command is received while receiving the write IO commands from the host. Since exclusions for the already received write IO commands are performed, the snapshot command exclusion process waits until all the received write JO processes have been completed. Also, write IOs received after the snapshot command are held until the exclusion of the snapshot command. In other words, just before the snapshot command is made exclusive and the snapshot is executed for the primary and secondary volumes, the write command is already executed for both volumes, so the data can remain the same. Such implementations ensure the integrity of the snapshot data.

For the example of FIG. 11(A) the write IO and snapshot point are stored at the same journal. After the journal transfer is conducted to the secondary side, if a snapshot point is detected at the time of upgrade, a snapshot is performed.

In example implementations described herein as illustrated in FIG. 11(B), the write IO and snapshot point are stored at the same journal. After the journal transfer is conducted to the secondary side, if a snapshot point is detected at the time of upgrade, a snapshot is performed.

Example implementations described herein can thereby be utilized for achieving data-consistent volume operations for both storages in a synchronous remote copy environment. For example, this is the case of creating a snapshot operation on a positive and negative volume for the purpose of periodic backup.

Figure 12:
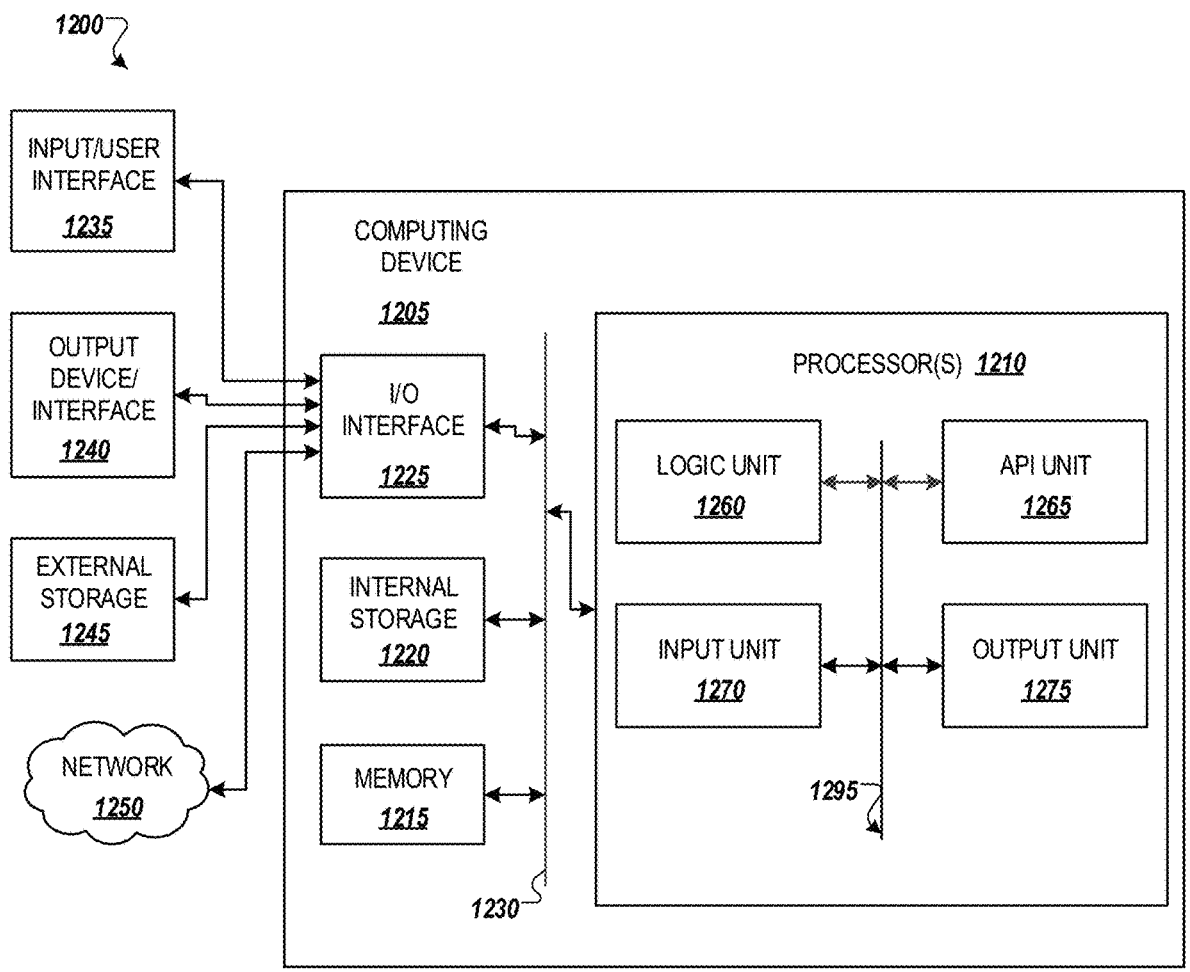
FIG. 12 illustrates an example computing environment with an example computer device suitable for use in some example implementations.

FIG. 12 illustrates an example computing environment with an example computer device suitable for use in some example implementations, such as the hardware platform to facilitate the storage devices and/or servers illustrated in FIGS. 1 and 2.

Computer device 1205 in computing environment 1200 can include one or more processing units, cores, or processors 1210, memory 1215 (e.g., RAM, ROM, and/or the like), internal storage 1220 (e.g., magnetic, optical, solid state storage, and/or organic), and/or IO interface 1225, any of which can be coupled on a communication mechanism or bus 1230 for communicating information or embedded in the computer device 1205. IO interface 1225 is also configured to receive images from cameras or provide images to projectors or displays, depending on the desired implementation.

Computer device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via IO interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

IO interface 1225 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1265, it may be communicated to one or more other units (e.g., logic unit

1260, input unit 1270, output unit 1275). In some instances, logic unit 1260 may be configured to control the information flow among the units and direct the services provided by API unit 1265, input unit 1270, output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide output based on the calculations described in example implementations.

Processor(s) 1210 can be configured to, for a command received for one of a first volume and a second volume during execution of a pair synchronization process between the first volume and the second volume, determine whether an address range of one of the first volume and the second volume configured to be provided to a host computer is to be locked based on the command; lock the address range of the one of the first volume and the second volume for the determination indicative of the address range of one of the first volume and the second volume is to be locked; and execute the command on the first volume and the second volume while the address range configured to be provided to the host computer is locked as illustrated in FIGS. 4-10.

Processor(s) 1210 can be configured to determine whether the address range of the one of the first volume and the second volume configured to be provided to the host computer is to be locked based on the command by referring to a command list that presets freeze requirements for the address range based on command type; and for the command having the command type associated with a freeze requirement for the address range based on the referring to the command list, providing the determination indicative of the address range of the one of the first volume and the second volume is to be locked as illustrated in FIG. 8.

As illustrated in FIG. 9 and FIG. 10, the command can involve a write operation command, wherein the processor(s) 1210 can be configured to execute the command on the first volume and the second volume while the address range configured to be provided to the host computer is locked by executing the command on the one of the first volume and the second volume; sending a completion token to a storage drive managing another one of the first volume and the second volume; and upon receipt of the completion token from the storage drive indicative of the executing of the command on the another one of the first volume and the second volume, unlocking the address range.

As illustrated in FIGS. 4-10, processor(s) 1210 can be configured to execute the command on the first volume and the second volume while the address range configured to be provided to the host computer is locked by executing the command on the first volume; and transferring the command to the second volume upon completion of the execution of the command on the first volume.

As illustrated in FIGS. 4-10, processor(s) 1210 can be configured to unlock the address range configured to be provided to the host computer after executing the command on the first volume and the second volume.

As illustrated in FIGS. 4-9 and FIGS. 10, 11(A) and 11(B), the pair synchronization process can involve generating snapshots for the first volume and the second volume.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   for a command received for one of a first volume and a second volume during execution of a pair synchronization process between the first volume and the second volume:
      determining whether an address range of one of the first volume and the second volume configured to be provided to a host computer is to be locked based on the command;
      locking the address range of the one of the first volume and the second volume for the determination indicative of the address range of one of the first volume and the second volume is to be locked; and
      executing the command on the first volume and the second volume while the address range configured to be provided to the host computer is locked,
      wherein the determining whether the address range of the one of the first volume and the second volume configured to be provided to the host computer is to be locked based on the command comprises:
         referring to a command list presets freeze requirements for the address range based on command type; and
         for the command having the command type associated with a freeze requirement for the address range based on the referring to the command list, providing the determination indicative of the address range of the one of the first volume and the second volume is to be locked.

2. The method of claim 1, wherein the command is a write operation command, wherein the executing the command on the first volume and the second volume while the address range configured to be provided to the host computer is locked comprises:
   executing the command on the one of the first volume and the second volume;
   sending a completion token to a storage drive managing another one of the first volume and the second volume; and
   upon receipt of the completion token from the storage drive indicative of the executing of the command on the another one of the first volume and the second volume, unlocking the address range.

3. The method of claim 1, wherein the executing the command on the first volume and the second volume while the address range is locked comprises:
   executing the command on the first volume; and
   transferring the command to the second volume upon completion of the execution of the command on the first volume.

4. The method of claim 1, further comprising unlocking the address range configured to be provided to the host computer after executing the command on the first volume and the second volume.

5. The method of claim 1, wherein the pair synchronization process comprises generating snapshots for the first volume and the second volume.

6. A non-transitory computer readable medium, storing instructions for executing a process, the instructions comprising:
   for a command received for one of a first volume and a second volume during execution of a pair synchronization process between the first volume and the second volume:
      determining whether an address range of one of the first volume and the second volume configured to be provided to a host computer is to be locked based on the command;
      locking the address range of the one of the first volume and the second volume for the determination indicative of the address range of one of the first volume and the second volume is to be locked; and
      executing the command on the first volume and the second volume while the address range configured to be provided to the host computer is locked,
      wherein the determining whether the address range of the one of the first volume and the second volume configured to be provided to the host computer is to be locked based on the command comprises:
         referring to a command list presets freeze requirements for the address range based on command type, and
         for the command having the command type associated with a freeze requirement for the address range based on the referring to the command list, providing the determination indicative of the address range of the one of the first volume and the second volume is to be locked.

7. The non-transitory computer readable medium of claim 6, wherein the command is a write operation command, wherein the executing the command on the first volume and the second volume while the address range configured to be provided to the host computer is locked comprises:
   executing the command on the one of the first volume and the second volume; sending a completion token to a storage drive managing another one of the first volume and the second volume; and
   upon receipt of the completion token from the storage drive indicative of the executing of the command on the another one of the first volume and the second volume, unlocking the address range.

8. The non-transitory computer readable medium of claim 6, wherein the executing the command on the first volume and the second volume while the address range is locked comprises:
   executing the command on the first volume; and
   transferring the command to the second volume upon completion of the execution of the command on the first volume.

9. The non-transitory computer readable medium of claim 6, the instructions further comprising unlocking the address range configured to be provided to the host computer after executing the command on the first volume and the second volume.

10. The non-transitory computer readable medium of claim 6, wherein the pair synchronization process comprises generating snapshots for the first volume and the second volume.

11. An apparatus, comprising:
   a processor, configured to:
      for a command received for one of a first volume and a second volume during execution of a pair synchronization process between the first volume and the second volume:

determine whether an address range of one of the first volume and the second volume configured to be provided to a host computer is to be locked based on the command;

lock the address range of the one of the first volume and the second volume for the determination indicative of the address range of one of the first volume and the second volume is to be locked; and execute the command on the first volume and the second volume while the address range configured to be provided to the host computer is locked, wherein the processor is configured to determine whether the address range of the one of the first volume and the second volume configured to be provided to the host computer is to be locked based on the command by:

referring to a command list presets freeze requirements for the address range based on command type; and for the command having the command type associated with a freeze requirement for the address range based on the referring to the command list, providing the determination indicative of the address range of the one of the first volume and the second volume is to be locked.

12. The apparatus of claim 11, wherein the command is a write operation command, wherein the processor is configured to execute the command on the first volume and the second volume while the address range configured to be provided to the host computer is locked by:

executing the command on the one of the first volume and the second volume; sending a completion token to a storage drive managing another one of the first volume and the second volume; and upon receipt of the completion token from the storage drive indicative of the executing of the command on the another one of the first volume and the second volume, unlocking the address range.

13. The apparatus of claim 11, wherein the processor is configured to execute the command on the first volume and the second volume while the address range configured to be provided to the host computer is locked by:

executing the command on the first volume; and transferring the command to the second volume upon completion of the execution of the command on the first volume.

14. The apparatus of claim 11, wherein the processor is configured to unlock the address range configured to be provided to the host computer after executing the command on the first volume and the second volume.

15. The apparatus of claim 11, wherein the pair synchronization process comprises generating snapshots for the first volume and the second volume.

\* \* \* \* \*